United States Patent [19]

Davis

[11] Patent Number: 4,860,004
[45] Date of Patent: Aug. 22, 1989

[54] DIGITAL SELECTIVE CALLING RECEIVER HAVING A SELECTIVELY ATTACHABLE DEVICE FOR MULTIPLE INDEPENDENT ADDRESS DECODING CAPABILITY

[75] Inventor: Walter L. Davis, Coral Springs, Fla.

[73] Assignee: Motorola, Inc., Schaumburg, Ill.

[21] Appl. No.: 140,455

[22] Filed: Jan. 4, 1988

[51] Int. Cl.[4] .......................... H04Q 7/00; G08B 5/22
[52] U.S. Cl. ...................... 340/825.440; 340/825.470; 340/825.200; 340/825.520
[58] Field of Search ...................... 340/825.44, 825.52, 340/825.48, 825.2, 825.47, 825.21, 311.1; 455/346, 349; 361/392, 393, 404; 379/56, 57, 58

[56] References Cited

U.S. PATENT DOCUMENTS 3,815,092 6/1974 Stephenson ..................... 340/825.52
4,177,426 12/1979 Gaishin et al. ..................... 455/349
4,509,210 4/1985 Kohn ................................... 455/349
4,518,961 5/1985 Davis et al. .................. 340/825.44
4,680,787 7/1987 Marry ................................. 455/349

Primary Examiner—Donald J. Yusko
Assistant Examiner—E. O. Pudpud
Attorney, Agent, or Firm—William E. Zitelli; Vincent B. Ingrassia

[57] ABSTRACT

A digital selective call receiver is modified to enhance the address decoding capability by providing access to received data, bit and frame synchronization signals, and a detect input terminal of an annunciator. A selectively attachable additional independent address decoding device including additional memory and an independent address decoder operating in parallel with the decoder in the selective call receiver is attached to the receiver for accessing the various signals and providing a detect signal to the annunciator when an additional independent address is decoded.

8 Claims, 5 Drawing Sheets

POCSAG SIGNALLING SYSTEM
*FIG. 2A*
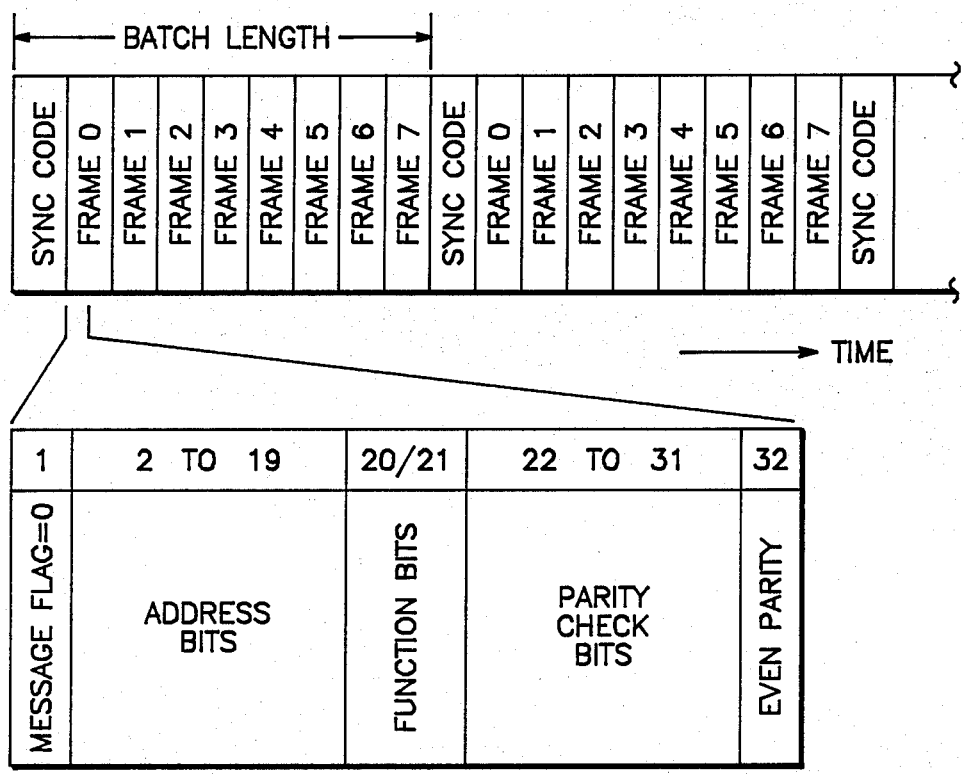
*FIG. 2B*
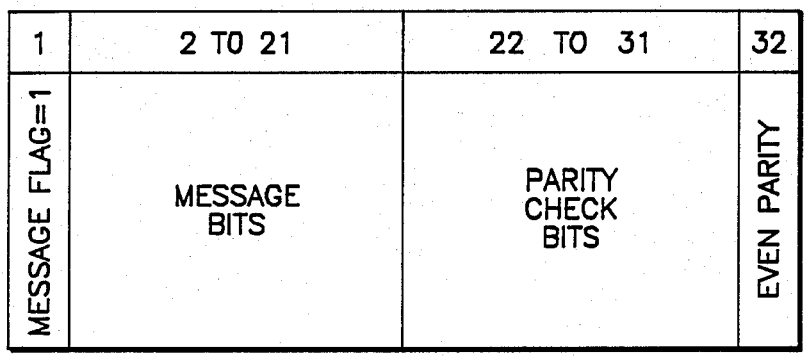
*FIG. 2C*

DIGITAL SELECTIVE CALLING RECEIVER HAVING A SELECTIVELY ATTACHABLE DEVICE FOR MULTIPLE INDEPENDENT ADDRESS DECODING CAPABILITY

FIELD OF THE INVENTION

The field of the present invention relates to digital selective signalling decoders and more specifically to decoders having multiple independent address capability.

BACKGROUND of the INVENTION

The majority of selective calling paging receivers available on the market include multiple independent addressing capability. This means that more than one signalling code can be used to cause the alerting mechanism of the paging receiver to activate. The receiver decoder when built in at the factory, must be capable of recognizing several independent addresses and thus causing an alert actuation.

In many applications for selective calling paging receivers, it is highly desirable that the paging device be able to receive and decode more than one address signal. It is especially important in some applications, such as public safety, to be able to alert a group of individuals with one paging signal while retaining the ability to alert or signal individual members of the larger group. This requirement for multiple independent addresses is by no means universal however, and providing this capability presently adds a considerable cost to the paging devices, and penalizes the single address or non-group call users.

In normal commercial usage, the vast majority of such paging receivers are used simply to notify the user to call a specified number such as his office. Thus, for the normal user of paging services, the decoder and therefore the receiver that he uses, is generally far more technically sophisticated than he would normally require. Much of the original cost of the selective call paging receiver lies in the design and the construction of the multiple independent address decoder mechanism. A less complicated decoder combined with the capability to add on a multiple address feature if required could result in a lower cost paging receiver.

The present invention is intended to lower the cost of the basic decoder for digital codes while allowing for virtually unlimited multiple independent address decoding capability by means of add on or replacement modules. The modules are customarily referred to as code plugs. This invention provides a way for adding the ability to decode multiple independent addresses to a basic single address digital paging decoder, and thus solves the cost problems associated with the previous multiple independent address design approaches. This invention also allows the decoding capability of a pager to be upgraded by means of replacement of the code memory or code plug, and does not burden the basic decoder device with the cost of all of the circuit elements required for multiple independent address decoding. Thus, the cost of multiple address decoding is only born by the users who need it. This approach places the cost burden for utilization for multiple address capability decoding on the users who need such capability.

SUMMARY AND OBJECTS OF THE INVENTION

In summary, the present invention includes a selectively attachable additional independent address decoding device for attachment to a digital selective call receiver which includes a receiver circuit, a decoder for decoding received signals, a memory containing a digital sequence corresponding to the address of a specific receiver, a comparator coupled to the decoder and memory to determine correspondence between the received signals and the digital sequence stored in said memory, and an annunciator responsive to the comparator for alerting the use of the reception of a selective call message, which comprises additional memory means containing at least one additional independent digital sequence address; additional decoder means for decoding received signals; and additional comparator means coupled between said additional decoder means and said additional memory means, for determining correspondence between the received signals and the additional independent digital sequence address, and user of the reception of a selective call message corresponding to the additional independent digital sequence address. Accordingly, it is an object of the present invention to provide a modular device which can be added to a single address selective call receiver to increase its capability to decode and alert for multiple independent addresses.

It is a further object of the present invention to lower the cost of basic decoders for selective call receivers while permitting virtually unlimited multiple independent address decoding capability by means of add on or replacement modules.

BRIEF DESCRIPTION OF THE DRAWINGS

Features of the invention which are believed to be novel are set forth with particularity in the appended claims. The invention itself, however, together with its further objects and advantages thereof, may be best understood by reference to the following description, when taken in conjunction with the accompanying drawings, in which:

FIG. 2A, 2B and 2C comprise descriptive diagrams of the POCSAG signal coding format and code word structure.

DESCRIPTION OF THE PREFERRED EMBODIMENTS

Figure 1:
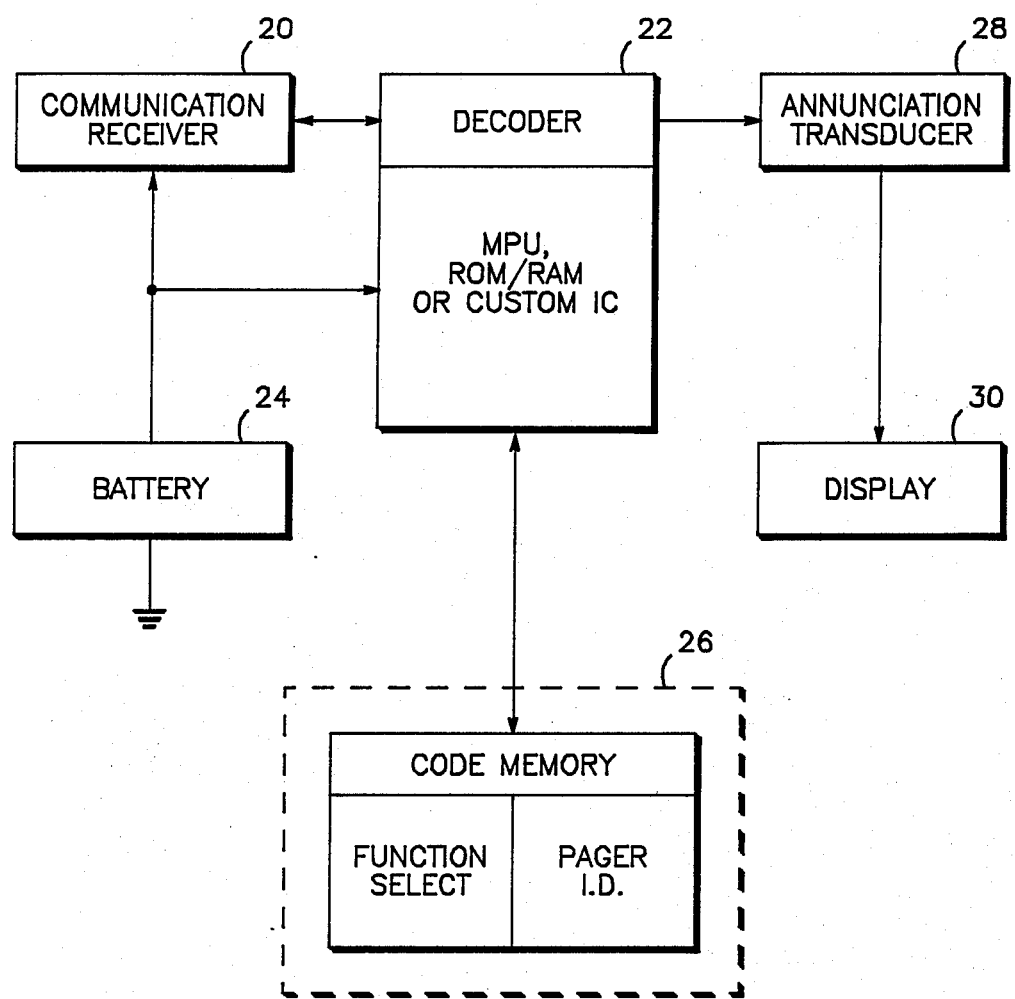
FIG. 1 is a functional block diagram of a prior art selective call pager.

FIG. 1 shows a functional block diagram of a prior art selective call pager. A communication receiver 20 is connected to a coded signal decoder 22. A battery 24 is shown connected to communication receiver 20 and decoder 22, which may be implemented with either microcomputer or a custom IC. Decoder 22 is additionally connected to a code memory 26 shown enclosed with a broken line. Code memory 26 further contain regions designated Function Select and Pager ID. The pager ID represents the unique multi-bit digital code word that represents the address of an individual pager and the function select designates code plug control of various pager device operations such as alerting sequence. The enclosure of code memory 26 with a broken line indicates that such a device can be made removable and therefore separable from the rest of the system. An output of signal decoder 22 is coupled to an annunciation transducer 28, which in turn is coupled to a display 30.

The operation of the system shown in FIG. 1 is such that the communication receiver is capable of receiving messages in a predetermined message format. Signal decoder 22 responds to the received signals to decode the incoming information received by communication receiver 20. As with all paging devices, the resulting decoded signal is tested for comparison with a designated pager address contained in code memory 26. Upon detecting correspondence between the received and decoded signal and the address in code memory 26, an output signal is provided indicating to the pager carrier that a message has been received. In particular, the output signal from decoder 22 is supplied to annunciation transducer 28 to inform the user of the receipt of a message. Frequently such pager devices include a display on which additional alphanumeric message information may be presented.

FIGS. 2A, 2B, and 2C show the standard message coding format for the paging coding system commonly known as POCSAG. Each transmission normally is at a bit rate of 512 bits per second and consists of a preamble code portion (not shown) followed by one or more batches of selectively arranged code words in eight predetermined time slots called frames. Each batch is delineated by a synchronization code word, and the information in all batches following the first synchronization code word is transmitted synchronously. Each code word contained in the batch is a 32 bit data sequence which contains information for synchronization, for addressing an individual pager, or for transmitting data to an addressed pager.

As shown in FIG. 2A, each batch of information begins with a 32 bit synchronization code word which is an invariant predetermined binary sequence. A batch that contains only address signals comprises a synchronization code word and sixteen address code words which are subdivided into eight separate time sequence frames containing two address code words each. Subsequent address batches contain the same format of a 32 bit synchronization word followed by a total of 16 address code words.

The address code words are grouped into eight frames numbered 0 to 7, and correspondingly, the entire pager address population is similarly divided into eight possible groups. Each pager address is allocated to one of the corresponding eight synchronous time frames according to the three least significant bits of an entire 21 bit address identity. The last three bits only designate the frame position. Thus, all pagers having a unique address code word which ends in 000 would be positioned in frame 0, and similarly, all pagers having a unique address code word ending in 111 would be in frame 7.

Address code words have a 32 bit structure and bit position 1 of an address code word is always a 0 as shown in FIG. 2B. Bit positions 2-19 comprise the 18 bits of address information corresponding to the 18 most significant bits of the entire 21 bit address identity sequence assigned to an individual POCSAG pager unit. The three least significant bits are not transmitted and are derivable from the frame position in a batch.

Bit positions 20 and 21 comprise two function bits which are used to select one function from the four possible functions assigned to the pager and would normally be used to activate different alerting sequences to the user. The term function bit is used to designate the different alerting operations since the decoding of these bits only selects which alerting or annunciation routine will be employed to notify the user of the decoding of the single 21 bit selective call address. These cannot be considered to be additional addresses since it is well known that these can be derived from single 32 bit stored address by the use of exclusive OR gate logic.

Bit positions 22 to 31 are parity check bits that are derived from the (31, 21) BCH code format used to derive the POCSAG code, and the final bit position 32, is chosen to have a value that gives even parity for the entire code word. The individual receiver devices in the POCSAG system will only examine address code words in a designated time frame, and therefore, each pager's address code word must be transmitted in the specific time frame that is allocated to that unit.

Each code word, whether a synchronization code word or an address code word or message code word, follows the same 32 bit format in which the most significant bit is transmitted first. The structure of a message code word is shown in FIG. 2C. Message code words have 20 message bits, bit 2 to bit 21 inclusive, and these are followed by parity check bit patterns similar to those used for address code words. A message code word always follows directly after the address code word that directs the message to a particular unit.

Figure 3:
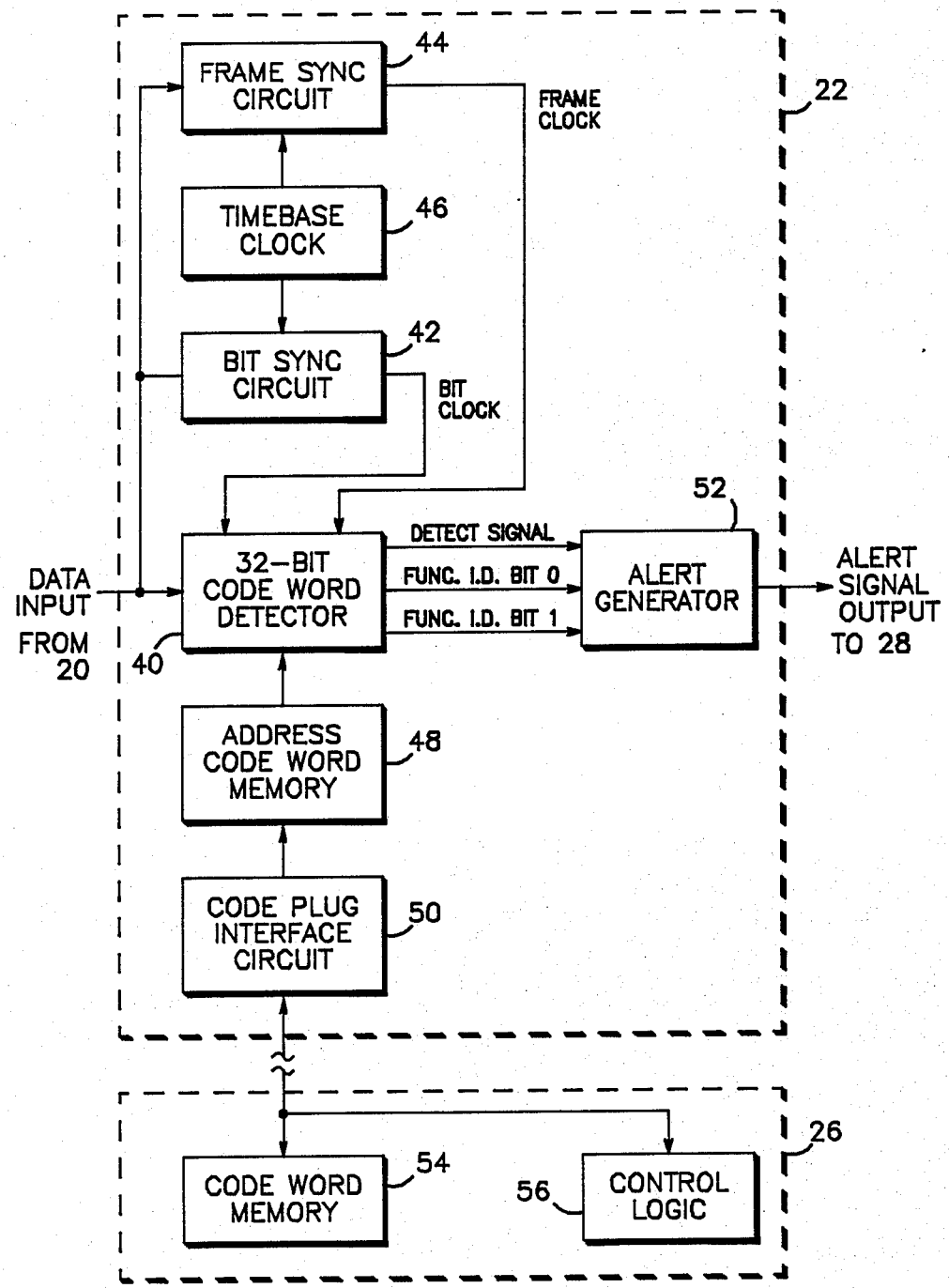
FIG. 3 shows a prior art basic decoder together with the code plug that is used to support single address decoding.

FIG. 3 shows in detail the basic prior art decoder together with the code plug that is used to support single address decoding. The decoder represented in FIG. 3 is a fairly conventional POCSAG decoder, which has been chosen as the coding system of the preferred embodiment. The decoder may be implemented by using a microprocessor with software loaded into a ROM or may be a custom designed integrated circuit. The POCSAG, code format has been shown and described in FIGS. 2A, 2B, and 2C. Data input from communication receiver 20 is supplied to a 32 bit code word detector 40 to bit sync circuit 42 and to frame sync circuit 44. A time base clock 46 supplies both bit sync circuit 42 and frame sync circuit 44. The output of bit sync circuit 42 is labeled bit clock and is supplied back to the 32 bit code word detector 40 and the output of frame sync circuit 44 is labeled frame clock and is also is supplied back to 32 bit code word detector 40. Code word detector 40 also receives information from an address code word memory 48 which is a temporary memory for processing the code word detection. Address code word memory 48 in return receives information from code plug interface circuit 50.

The output of code word detector 40 includes a detect signal which is supplied to an alert generator 52. In addition, the function identification bit zero and function identification bit one information is also supplied from code word detector 40 to alert generator 52. The output of alert generator 52 is labeled alert signal output and is directed to annunciation transducer 28 as shown in FIG. 1. The decoder portion is shown enclosed in a broken line and labeled 22 to indicated that it is to a more detailed description of the decoder shown in FIG. 1.

Also shown in FIG. 3 is a code plug 26 which includes a code word memory 54 and control logic 56. Code plug 26 is separable or removable from the device containing decoder 22. Code word memory 54 contains the 32 bit sequence that is the single address to identify an individual paging receiver. Control logic 56 contains the additional circuitry to transfer information from code word memory 54 through code plug interface circuit and into address code word memory 48 under the direction and control of the decoder operation. In addition, control logic 56 may include circuitry to enable certain features such as designating whether multiple alerting features are available in the unit to respond to the function identification and other user functions of the device.

In operation, the bit synchronization circuitry 42 synchronizes the bit sampling interval used in the decoding process with the received data from communication receiver 20. Frame synchronization timing circuit 42 establishes the appropriate timing to be used to decode the address and the sync code word used in the code transmission sequence for POCSAG. Code word detector 40 compares the received code words with the reference code word associated with the address bit sequence contained in the code plug memory that is the 32 bit sequence contained in code word memory 54 which is itself contained in code plug 26.

For the case shown in FIG. 3, there is only one address sequence but there may be four variations or functions that can be associated with that one basic address sequence. This is consistent with the four possible functions associated with each independent address of a POCSAG coded receiver. If a code word associated with the unique address sequence stored in code word memory 54 is received the alert logic contained in alert generator 52 generates one of four output alert patterns which are supplied to annunciation transducer 28 to indicate which function for the addressed receiver had been received.

Figure 4:
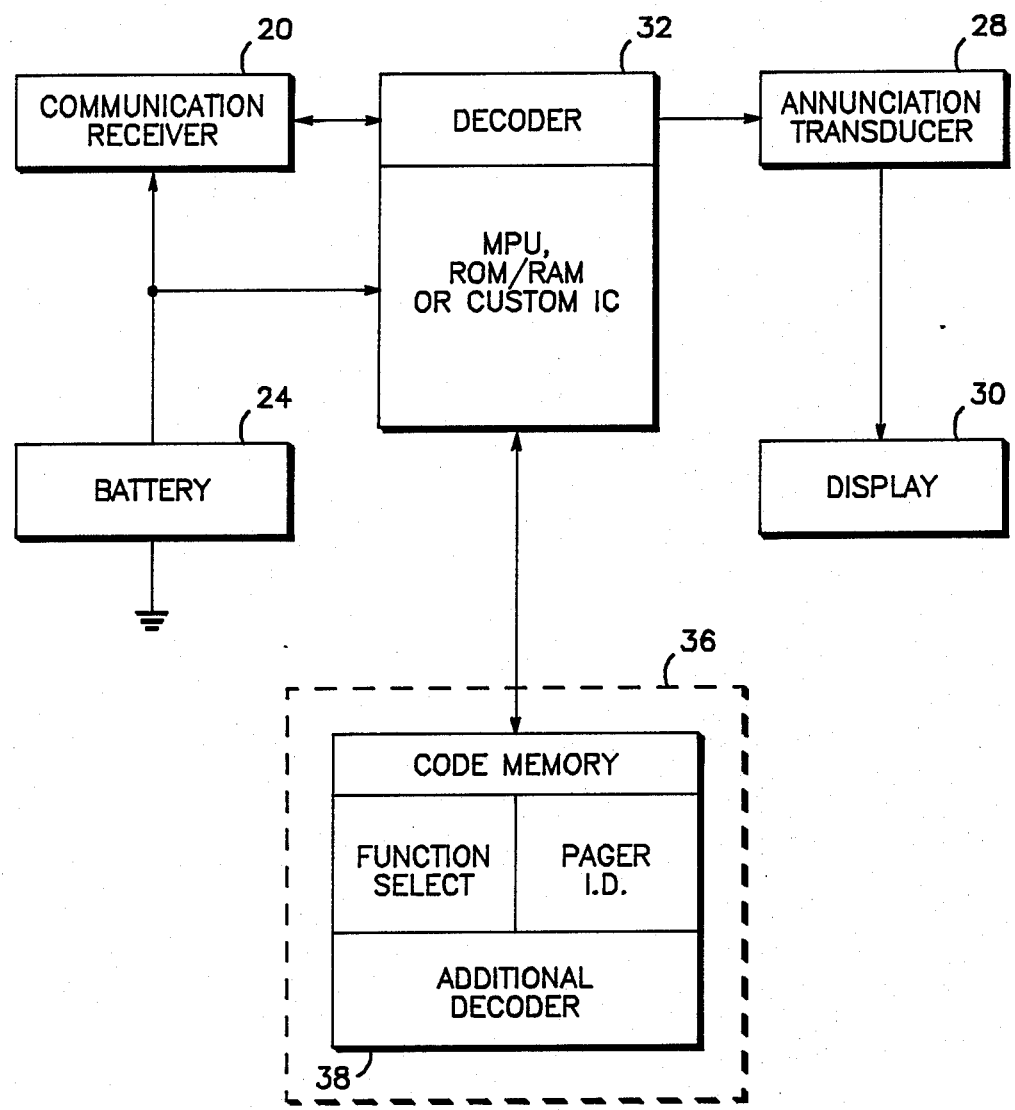
FIG. 4 is a functional block diagram of a digital selective call pager embodying the present invention.

FIG. 4 shows a functional block diagram of a selective call pager employing the present invention. It is similar to the prior art functional block diagram of FIG. 1 with the change that decoder 22 is now replaced with a decoder 32 and code memory 26 is replaced by code memory 36 which among other things now includes additional code word decoder 38. As before with decoder 22, decoder 32 may be implemented with a microcomputer or as a custom IC. Code memory 36 is shown enclosed in a broken line to indicate that it is separable from the pager system. The operation of the paging receiver including the present invention is similar to the operation of the receiver for FIG. 1 except that now, by means of the new code plug memory and additional decoder, one or more additional independent address may be properly decoded to cause actuation and provide an alert to the user on the reception of a message.

Figure 5:
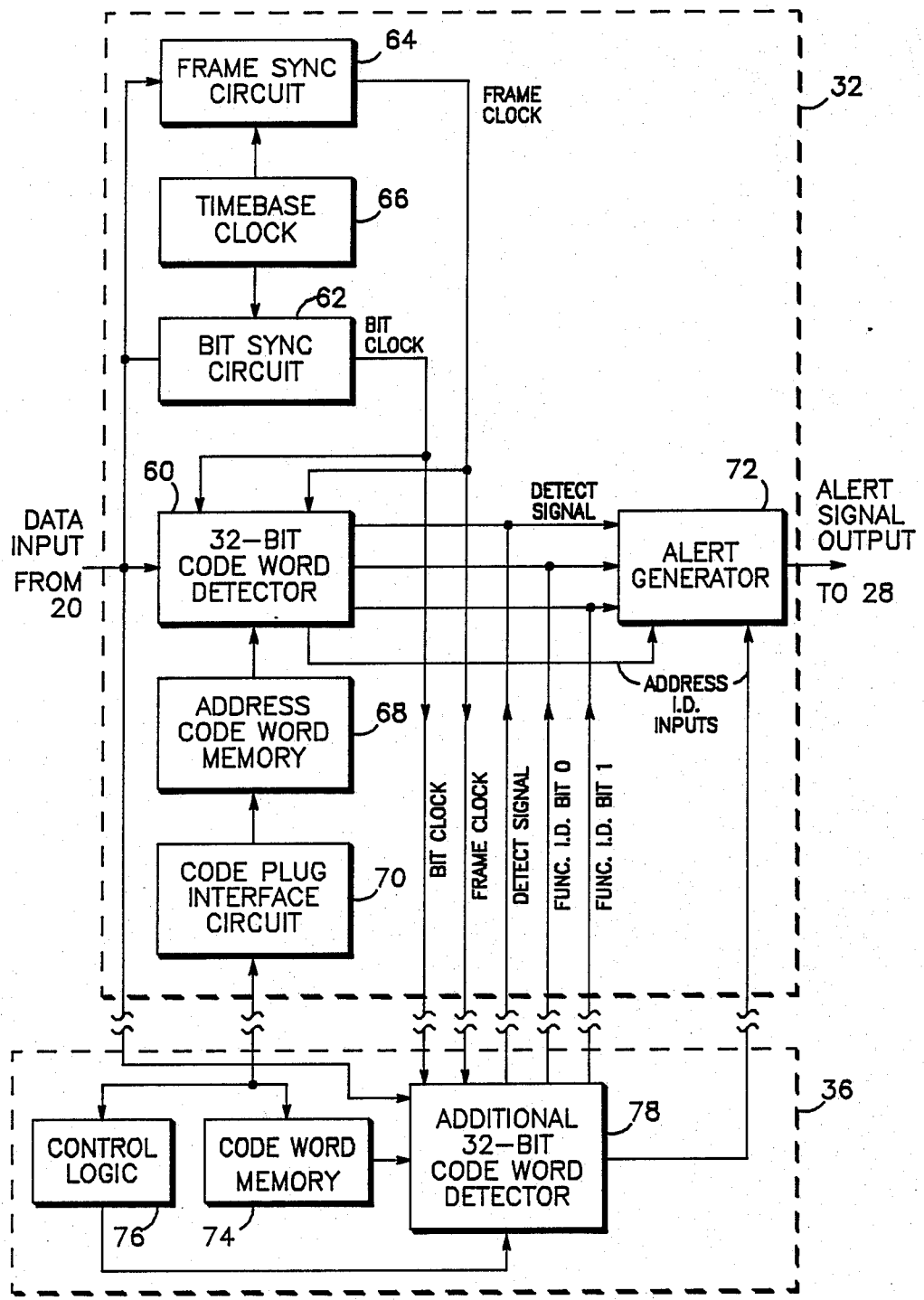
FIG. 5 is a more detailed block diagram of FIG. 4 present invention showing the preferred embodiment.

FIG. 5 shows a decoder together with the code plug that employs the present invention and is used to support multiple independent address decoding. Decoder 32 represented in FIG. 5 is a substantially modified POCSAG decoder, which is capable of properly responding to the attachment of a new code plug for the modular addition of the capability of multiple independent address decoding. Data input from communication receiver 20 is supplied to a 32 bit code word detector 60 to bit sync circuit 62 and to frame sync circuit 64. A time base clock 66 supplies both bit sync circuit 62 and frame sync circuit 64. The output of bit sync circuit 62 is labeled bit clock and is supplied back to the 32 bit code word detector 60 and the output of frame sync circuit 64 is labeled frame clock and is also supplied back to 42 bit code word detector 60. Code word detector 60 also receives information from an address code word memory 68 which is a temporary memory for processing the code word detection. Address code word memory 68 in return receives information from code plug interface circuit 70.

The output of code word detector 60 includes a detect signal which is supplied to an alert generator 72. Code word detector 60 is also directly coupled to alert generator 72 to provide address IO information which is used by alert generator 72 to distinguish the detection of different multiple independent addresses. In addition, the function identification bit zero and function identification bit one information is also supplied from code word detector 60 to alert generator 72. The output of alert generator 72 is labeled alert signal output and is directed to annunciation transducer 28 as shown in FIG. 4. The decoder portion is shown enclosed in a broken line and labeled 32 to indicated that it is a more detailed description of the decoder shown in FIG. 4.

Also shown in FIG. 5 is a code plug 36 which includes code word memory 74, control logic 76, and an additional code word detector 78. Code plug 36 is enclosed with a broken line to show that it is separable or removable from the device containing decoder 32. Data input from communication receiver 20 is supplied to an additional 32 bit code word detector 78. One portion of code word memory 74 and control logic 76 are coupled to code plug interface circuit 70. The second portion of code word memory is coupled to additional code word detector 78. Control logic 76 is further coupled to additional code word detector 78. The bit clock output of bit sync circuit 62 and the frame clock output of frame synchronization circuit 64 are also coupled to additional code word detector 78. Additional code word detector 78 also produces a detect signal, a function identification bit zero, and a function identification bit one signal which are coupled and connect with alert generator 72. Thus, when either code word detector 60 indicates a detect signal or identifies a bit one or bit zero or when additional code word detector 78 identifies a detect signal or identifies a bit one or bit zero condition, alert generator 72 can respond in a correct manner. Additional code word detector 78 is also directly connected to alert generator 72 to provide address IO output information which can be used to distinguish the detection of the different multiple independent addresses that can be contained in the code plug.

Code word memory 74 contains two or more 32 bit sequences that are the multiple independent addresses which identify the individual paging receiver. Control logic 76 contains the additional circuitry necessary to transfer information from code word memory 74 through code plug interface circuit 70 into address code word memory 68 under the direction and control of decoder 32 and ultimately for processing by code word detector 60. In addition code word memory 74 also supplies 32 bit code word information to additional code word detector 78 so that an independent address can be identified. In addition, control logic 76 may included circuitry to enable certain features such as designating whether multiple alerting is available to respond to the function identification and other user functions of the device.

In operation, the bit synchronization circuitry 62 synchronizes the bit sampling interval used in the decoding process with the received data from communication receiver 20. Frame synchronization timing circuit 62 establishes the appropriate timing to be used to decode the address and the sync code word used in the code transmission sequence for POCSAG. Code word detector 60 and additional code word detector 78 compare the received code word with the reference code words associated with the address bit sequence contained in the code plug 36. Each decoder receives an appropriate one of the 32 bit sequences contained in the code word memory 74 to identify the individual device. For the case shown in FIG. 5, there is shown one address sequence for each of decoder 60 and additional decoder 78 but there may be four variations or functions that can be associated with either basic address sequence. This is consistent with the four possible functions associated with each independent address of a POCSAG coded receiver.

It will be clear to those skilled in the art that additional decoders 78 operating in parallel may be included in code plug 36 to provide an even larger number of multiple independent address detections. If a code word associated with either of the two independent address sequences of the preferred embodiment stored in code word memory 74 is received, the logic contained in alert generator 72 generates, in response to the address IO information from code word detector 60 or additional code word detector 78, one of four output alert patterns which are supplied to annunciation transducer 28 to indicate which function for the addressed receiver had been received and a further indication of which address was detected.

It should also be clear that the decoder shown in FIG. 5 can also function when a simple one address code plug similar to that shown in FIG. 4 is used in place cf code plug 36. Thus, the decoder of FIG. 5 can be expanded via the replacement of the code plug to decode more than one independent address.

while specific embodiments of this invention have been shown and described, further modifications and improvements will occur to those skilled in the art. All modifications which retain the basic underlying principles disclosed and claimed herein are within the scope of this invention.

I claim:

1. In a digital selective call receiver including a receiver circuit for receiving transmitted signals, and a decoder for decoding said received signals, said decoder comprising: a memory containing a digital sequence corresponding to one address of the receiver; means for generating bit and frame synchronization signals; a comparator coupled to the receiver circuit and memory and governed by the bit and frame synchronization signals to determine correspondence between the receiver signals and the digital sequence stored in said memory; and annunciator responsive to the comparator for alerting the user of such correspondence which is indicative of the reception of a selective call message, a selectively attachable additional independent address decoding device comprising:
additional memory means containing at least one additional independent digital sequence address; and
additional decoder means operative in parallel with said decoder for independently decoding received signals including
additional comparator means coupled between the receiver circuit and said additional memory means, and governed by the bit and frame synchronization signals of the decoder to determine correspondence between the received signals and the additional independent digital sequence address, and for providing a separate signal to the annunciator for alerting the user of such correspondence which is indicative of the reception of a selective call message corresponding to the at least one additional independent digital sequence address.

2. The selectively attachable decoding device of claim 1 wherein the additional memory means is contiguous with said memory.

3. The selectively attachable decoding device of claim 1 further including means for generating an additional signal and providing said signal to said annunciation means to distinguish the detection of at least one additional independent address.

4. The selectively attachable decoding device of claim 3 wherein said decoder further includes means to detect the reception of functional code words which are not independent of the additional independent address and supply signals representative of the detected functional code words to the annunciator.

5. A digital selective call receiver including a receiver circuit for receiving transmitted signals, and a decoder for decoding said received signals, said decoder comprising a memory containing a digital sequence corresponding to one address of the receiver; means for generating bit and frame synchronization signals; a comparator coupled to the receiver circuit and memory and governed by the bit and frame synchronization signals to determine correspondence between the received signals and the digital sequence stored in said memory; an annunciator responsive to the comparator for alerting the user of such correspondence which is indicative of the reception of a selective call message; and means for electrically coupling another selectively attachable independent address decoding device which is operative in parallel with said decoder, said electrical coupling means comprising:
means for rendering said bit and frame synchronization signals electrically accessible to said another decoder device from said decoder;
means for rendering said received signals electrically accessible to said another decoder device from said receiver circuit; and
means for rendering an input terminal of said annunciator electrically accessible to a detect signal from said another decoder device.

6. The digital selective call receiver of claim 5 further including means for rendering aid annunciator electrically accessible to signals of the another decoder device which indicate the reception of code words which are not independent of an additional independent address of the another decoder device.

7. The digital selective call receiver of claim 5 further including means for rendering said annunciator electrically accessible to an additional signal from said another decoder device.

8. A selectively attachable additional independent address decoding device for attachment to a digital selective call receiver, said receiver including a receiver circuit for receiving transmitted signals, and a decoder for decoding said received signals, said decoder comprising: a memory containing a digital sequence corresponding to the address of a specific receiver; means for generating bit and frame synchronization signals; a comparator coupled to the receiver circuit and memory and governed by the bit and frame synchronization signals to determine correspondence between the received signals and the digital sequence stored in said memory, and an annunciator responsive to the comparator for alerting the user of the reception of a selective call message, said additional decoding device comprising:

additional memory means containing at least one additional independent digital sequence address; and additional decoder means operative in parallel with said decoder for independently decoding received signals including additional comparator means coupled between said receiver circuit and said additional memory means, and governed by the bit and frame synchronization signals of the decoder to determine correspondence between the received signals and the additional independent digital sequence address, and for providing a separate signal to the annunciator to alert the user of the reception of a received signal corresponding to the additional independent digital sequence address.

* * * * *

UNITED STATES PATENT AND TRADEMARK OFFICE
CERTIFICATE OF CORRECTION

PATENT NO. : 4,860,004
DATED      : August 22, 1989
INVENTOR(S): Walter L. Davis It is certified that error appears in the above-identified patent and that said Letters Patent is hereby corrected as shown below:

Col. 7, line 57, delete "receiver" and insert --received--.

Col. 8, line 21, after "said", insert --additional--.

Signed and Sealed this

Third Day of July, 1990

*Attest:*

HARRY F. MANBECK, JR.

*Attesting Officer*  *Commissioner of Patents and Trademarks*